United States Patent Office 3,272,088
Patented Sept. 13, 1966

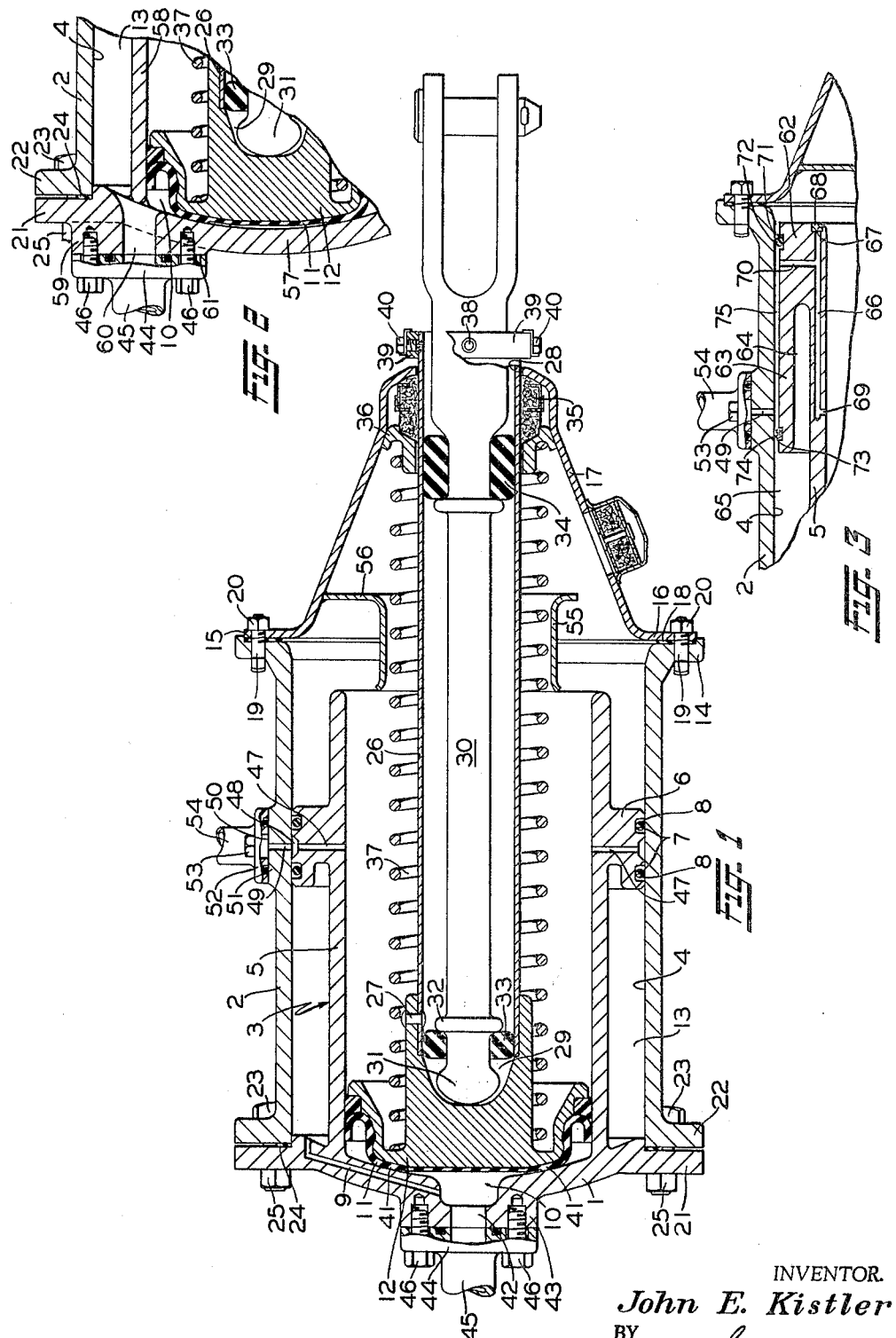

3,272,088
CONVERSION BRAKE CYLINDER
John E. Kistler, Atlanta, Ga., assignor to Westinghouse Air Brake Company, Wilmerding, Pa., a corporation of Pennsylvania
Filed June 17, 1964, Ser. No. 375,852
9 Claims. (Cl. 92—59)

This invention relates to brake cylinder devices, and, more particularly, to means for readily and inexpensively converting existing large size brake cylinder devices to relatively smaller size brake cylinders suitable for use with molded brake shoes in existing railway braking equipment in place of customary cast iron brake shoes.

The molded type of brake shoe, as referred to herein, may consist of a composition material that includes, for example, cast iron chips molded with a binding medium comprising rubber and resin. The molded type brake shoes have a much higher coefficient of friction than cast iron type shoes and retain an almost constant coefficient of friction over a wide range of vehicle wheel speeds thereby requiring a lesser brake-shoe-applying pressure than for cast iron shoes to effect the same degree of braking on the wheels of a railway car.

Tests conducted with the molded type brake shoes show that for obtaining substantially corresponding braking effect, approximately one-fourth of the application force is required for the molded type brake shoes as is required for the cast iron type brake shoe commonly used on the American railroads at the present time. Such tests indicate that the application force exerted by the presently existing brake cylinders and brake rigging is far in excess of that necessary for the molded type of brake shoes. Simply using a lesser degree of fluid pressure or reducing the size of the brake cylinder to reduce the braking force applied to the shoe will introduce complications because of pressure equalization problems incident to the use with existing fluid pressure brake control valve devices. Moreover, modification or complete replacement of existing brake control equipment and brake rigging on railway cars, to conform to the requirements of the molded type of brake shoe, would be very costly, and economically would not warrant the change over to molded brake shoes in many instances.

In Patent No. 2,880,043, issued March 31, 1959, to William C. Landis, and assigned to the assignee of this application, there is disclosed and claimed a conversion liner or element for use with existing brake cylinder devices that comprises a cylindrical sleeve in which is slidably mounted a piston smaller in diameter than the original piston used prior to the conversion, the wall thickness of the sleeve being such that the equalizing volume provided in the converted brake cylinder, including the annular space between the outside of the sleeve and the inside wall surface of the brake cylinder body, is substantially the same as the equalizing volume in the existing brake cylinder before the conversion was made. This conversion element is limited to use with brake cylinders that do not require a port in the cylinder wall via which to supply fluid under pressure to a slack adjuster device when the piston travel becomes excessive due to wear of the brake shoes.

Accordingly, it is an object of this invention to provide a simple and relatively low cost device for effecting a conversion of existing brake cylinders so as to adapt these existing brake cylinders to deliver the proper amount of applying force to the molded type of brake shoe without interfering with the proper operation of the existing pneumatic brake control equipment presently on the car, and which makes provision for operation of a slack adjusting mechanism when piston travel becomes excessive.

According to the invention, a relatively thin-walled tubular or sleeve-like conversion element that is formed integral with a brake cylinder pressure head so as to be adapted for coaxial mounting within the original brake cylinder body carries a flange intermediate the ends thereof having a pair of spaced-apart peripheral annular grooves formed therein for receiving a pair of O-rings, each of which forms a seal with the wall of the bore in the brake cylinder body, the location of the flange being selected to provide appropriate equalization volume corresponding to the equalization volume of the original cylinder, for the required diameter of piston in the conversion element that will provide the proper force for pressing the molded type of brake shoes against the tread surfaces of the corresponding wheels. This equalization volume is connected by a suitable passageway formed in the pressure head with the volume formed at the pressure side of the piston having the required area. Thus, with a piston having the required area for providing the essential brake-shoe-applying force at the equalization pressure between the auxiliary reservoir and the brake cylinder, the provision of an equalization volume determining flange makes the use of the conversion element practical for different types and sizes of brake cylinders in accordance with brake-applying force requirements since the diameter of the flange can be selected to correspond to the diameter of the brake cylinder body and the inside diameter of the conversion element selected to correspond to the required diameter of the piston.

The invention further comprises the provision of a radially extending passageway formed in the flange and disposed between the pair of spaced-apart peripheral annular grooves thereon via which passageway fluid under pressure may flow from a slack adjuster control port in the wall of the conversion element to a corresponding passageway formed in the brake cylinder body and open at one end at a flat surface formed on the exterior of the brake cylinder body to which a flanged fitting may be secured, this flanged fitting receiving one end of a pipe that at its opposite end is connected to the usual slack adjuster device.

In the accompanying drawings:

FIG. 1 is an elevational view, in section, of a brake cylinder device embodying the novel conversion element of the present invention.

FIG. 2 is a partial sectional view, in elevation, of a second embodiment of the invention showing an alternate pipe connection for the pipe through which fluid under pressure is supplied to the face of the brake cylinder piston and the equalization volume.

FIG. 3 is a partial sectional view, in elevation, embodying a modified form of equalization volume determining flange constructed in accordance with a third embodiment of the invention.

Description—FIG. 1

As shown in FIG. 1 of the drawings, a brake cylinder device embodying the invention comprises a pressure head 1 and a brake cylinder body 2, but differs from conventional brake cylinder devices in having a hollow cylindrical conversion element 3 that is formed integral with the pressure head 1 and disposed in the usual bore 4 in the brake cylinder body 2. The cylindrical conversion element 3 comprises a sleeve 5 that at one end is integrally formed with the pressure head 1. Intermediate the ends of the sleeve 5 it is provided with an out-turned equalization volume determining flange 6. The out-turned equalization volume determining flange 6 is provided with two spaced-apart peripheral annular grooves 7 in each of which is disposed an O-ring 8, the outer periphery of each of which cooperates with the wall surface of the bore 4 in the brake cylinder body 2 to form a seal therewith. The pressure head 1 is provided with a passageway 9 in order that fluid under pressure supplied to a pressure chamber 10 formed between the pressure head 1 and a packing cup 11 secured to a piston 12 slidably disposed in the sleeve 5 may flow to a chamber 13 formed by the cooperative relation of the pressure head 1, the outer periphery of the sleeve 5, the equalization volume determining flange 6, and the wall surface of the bore 4 in the brake cylinder body 2, because the volume of the chambers 10 and 13, along with the volume to the left of the piston 12 as the piston 12 moves in the direction of the right hand to its application position, provides a volume in the modified brake cylinder device that is substantially equivalent to the volume of the old brake cylinder device, it being understood that the location of the equalization volume determining flange 6 is so selected that the combined volume of the chamber 10 with that of the chamber 13 is substantially equal to the volume of the old brake cylinder device assuming equivalent normal full piston travel in both instances. By thus retaining substantially the same brake cylinder equalization volume, it is possible to retain on a railway car the same auxiliary reservoir and associated fluid pressure operated devices for effecting the supply of fluid under pressure from the auxiliary reservoir to the modified brake cylinder device to obtain the desired reduced braking force on the wheels of the car.

An annular flange 14 formed on the right-hand end of the brake cylinder body 2 has a cutback or offset surface 15 machined thereon, as shown in FIG. 1, and between which surface and an annular flange 16 formed on a non-pressure head 17 is disposed an annular seal gasket 18. The annular seal gasket 18 is clamped between the cutback or offset surface 15 and the flange 16 by a plurality of bolts 19 and nuts 20, two of which appear in FIG. 1. The bolts 19 extend through the holes that are presently in the flange 14 formed on the right-hand end of the brake cylinder body 2 and corresponding holes formed in the flange 16 on the left-hand end of the non-pressure head 17. The bolts 19, nuts 20 and gasket 18 may be the same as those formerly used to secure the previously-used non-pressure head 17 to the flange 14 on the brake cylinder body 2.

The pressure head 1 is provided with an annular flange 21, and the left-hand end of the brake cylinder body 2 is provided with an annular flange 22, each of these flanges being provided with a plurality of arcuately spaced holes for receiving a plurality of bolts 23, two of which appear in FIG. 1. An annular seal gasket 24 is disposed between the left-hand end of the brake cylinder body 2 and the right-hand side of the flange 21 of the pressure head 1, which annular gasket is adapted to form a fluid pressure seal when a nut 25 is tightened onto each of the bolts 23. It should be understood that the gasket 24, bolts 23 and nuts 25 may be the same as those used to secure the former pressure head to the flange 22 of the body 2 of the brake cylinder device before the conversion was made, provided that this gasket and these nuts and bolts are not pitted, corroded, or rusted to such an extent that they are unfit for use. It will also be understood that subsequent to removing the old pressure head from the left-hand end of the brake cylinder body 2, the sleeve 5, having the equalization volume determining flange 6, is inserted into the left-hand end of the bore 4 in the brake cylinder body 2 and then pushed into position, in which it is shown in FIG. 1 of the drawings.

The piston 12 is slidably mounted in the sleeve 5 and a hollow rod 26 secured coaxially to the piston 12 by means of a plurality of rivets 27, one of which appears in FIG. 1, extends slidably through a central opening or bore 28 in the non-pressure head 17.

Piston 12 is provided with a recess 29 that is coaxial with the piston. This recess 29 is adapted to receive one end of a push rod 30. The left-hand end of the push rod 30 is provided with a knob 31 having a spherical outer surface that is disposed in the recess 29 in the piston 12 and rests against the left-hand end thereof. Disposed between the knob 31 and a rib 32 formed on the push rod 30 and arranged coaxially about the push rod 30 is an annular cushioning element 33 which is constructed of rubber or some other suitable material. The push rod 30 also carries thereon a push rod sealing ring 34 that is disposed adjacent to the exterior end of the hollow rod 26.

A hollow packing seal 35 is disposed about the hollow rod 26 and between the right-hand end of the non-pressure head 17 and a spring seat 36 also disposed about the hollow rod 26. One end of a brake cylinder release spring 37 rests against the spring seat 36 and the opposite end of this spring rests against the right-hand side of the piston 12.

In order that the hollow rod 26 and the push rod 30 move together when piston 12 is moved to its release position by the release spring 37, the push rod 30 is secured to the hollow rod 26 by a push rod holder pin 38 that extends through two diametrically arranged bores in a collar identified as a push rod holder 39, two corresponding bores in the hollow rod 26, and a corresponding bore in the push rod 30, it being understood that the push rod holder 39 is secured to the hollow rod 26 by a pair of set screws 40.

Formed on the packing cup 11 are a plurality of lugs 41 which, when the piston 12 occupies the position in which it is shown in FIG. 1, contact the right-hand side of the pressure head 1 to form between the pressure head 1 and the piston 12 the pressure chamber 10 to which fluid under pressure may be supplied through a passageway 42 extending through a boss 43 and a flange fitting 44 to which is secured a pipe 45, the flange fitting 44 being secured to the boss 43 by a pair of cap screws 46.

As shown in FIG. 1, the equalization volume determining flange 6 is provided with a plurality of passageways 47, two of which are shown, the outer end of which opens onto a peripheral annular groove 48 formed on the equalization volume determining flange 6 substantially midway between the hereinbefore-mentioned peripheral annular grooves 7 formed on this flange. The inner end of each of the passageways 47 opens into the interior of the sleeve 5. As shown in FIG. 1, the brake cylinder body 2 is provided with a slack adjuster port or passageway 49, it being understood that the location of the equalization volume determining flange 6 intermediate the ends of the sleeve 5 is such that the passageway 49 and the passageway 47 are coaxial. The upper or outer end of the passageway 49 opens at a flat surface 50 formed on a boss 51 that is integral with the brake cylinder body 2. A flange fitting 52 is secured to the boss 51 by a pair of cap screws 53, one of which appears in FIG. 1. The flange fitting 52 receives one end of a pipe 54 that has its other end connected to a slack adjuster device (not shown).

In order to maintain the intermediate portion of the spring 37 in substantial concentric relation with the hollow rod 26 and thus prevent the spring 37 from sagging or buckling into contact with the hollow rod and causing damage to the same, there is provided a sleeve 55 which encircles the spring 37 and which has an inside diameter slightly greater than the outside diameter of the spring to allow free movement of the spring through the sleeve. The sleeve 55 is held in place by three radially arranged metallic strips 56, only one of which appears in FIG. 1 of the drawing, one end of each of these strips being welded to the interior of the non-pressure head 17 and the opposite end being formed integral with the sleeve 55.

It will be noted that by providing the existing brake cylinder device installed on the railway car with the cylindrical conversion element 3, a smaller internal diameter of the brake cylinder device is thus obtained and the piston 12 used in the cylindrical conversion element 3 is accordingly smaller than the piston previously used in the brake cylinder body 2. Therefore, the force exerted by the piston 12 on the brake shoe (not shown) as compared to the force exerted by the old type piston is reduced proportionally to the reduction in piston area without substantially reducing the equalizing volume of the brake cylinder device, because, as hereinbefore stated, the volume of the chamber 10 along with the volume of the chamber 13, which is connected to the chamber 10 by the passageway 9, and the volume to the left of the piston 12 as the piston moves in the direction of the right hand to its application position, provides a volume in the modified brake cylinder device that is substantially equivalent to the volume of the old brake cylinder device, with the consequent equivalent pressure of equalization incidental to a brake application. By thus retaining substantially the same equalization volume, it is possible to retain on the railway car the same auxiliary reservoir and associated fluid pressure operated devices for effecting the supply of fluid under pressure from the auxiliary reservoir to the modified brake cylinder device to obtain the desired reduced braking force for applying the brake shoes to the wheels of the car.

*Description—FIG. 2*

According to a second embodiment of the invention, a pressure head 57, which is shown in detail in FIG. 2, replaces the pressure head 1 shown in FIG. 1 to provide a converted brake cylinder device that functions substantially the same as the converted brake cylinder device shown in FIG. 1. Accordingly, like reference numerals have been used to designate the structure shown in FIG. 2, which is identical with that shown in FIG. 1. Only such features of the structure of the embodiment of FIG. 2 which differ from that of the embodiment of FIG. 1 will be hereinafter described, it being understood that the operation of the two embodiments is substantially the same.

According to the embodiment of the invention shown in FIG. 2, the pressure head 57 has formed integral therewith a sleeve 58 that is otherwise identical to the sleeve 5 shown in FIG. 1, in that it is provided with an equalization volume determining flange (not shown) that is identical to the equalization volume determining flange 6 shown in FIG. 1.

Furthermore, according to the embodiment of the invention shown in FIG. 2, the pressure head 57 is provided with a boss 59 that replaces the centrally located boss 43 shown in FIG. 1. The boss 59 is provided with a passageway 60 that, as shown in FIG. 2, opens at its right-hand end into the chamber 13 formed between the peripheral surface of the sleeve 58 and the inside wall surface of the bore 4 in brake cylinder body 2, and also into the pressure chamber 10 formed between the pressure head 57 and the packing cup 11 secured to the piston 12. The left-hand end of the passageway 60 opens at a flat surface 61 formed on the boss 59 and in alignment with the passageway formed in the flange fitting 44 which is secured to the boss 59 by the cap screws 46, the pipe 45 being secured to the flange fitting 44, as shown in FIG. 1.

The converted brake cylinder devices shown in FIGS. 1 and 2 are identical in construction, except as pointed out above.

The operation of the converted brake cylinder devices shown in FIGS. 1 and 2 is identical.

*Description—FIG. 3*

In FIG. 3 of the drawing is shown a portion of a converted brake cylinder device constructed in accordance with a third embodiment of the invention.

As shown in FIG. 3, the equalization volume determining flange 6 which is formed integral with the sleeve 5 intermediate the ends thereof, as shown in FIG. 1, is replaced by an out-turned flange 62 which is formed integral with the sleeve 5 at the right-hand end thereof. The out-turned flange 62 has extending from the left-hand side thereof and formed integral therewith a short sleeve 63 that is concentric with the sleeve 5 and has an outside diameter somewhat less than the diameter of the bore 4 in the brake cylinder body 2. The sleeve 63 cooperates with the sleeve 5 to form an annular chamber 64 between the sleeves 5 and 63. The annular chamber 64 is constantly open to an annular chamber 65 formed between the peripheral surface of the sleeve 5 and the wall surface of the bore 4 in the brake cylinder body 2, the volume of the annular chamber 65 being substantially the same as the volume of the chamber 13 shown in FIG. 1. The length of the short sleeve 63 is such as to extend in the direction of the left hand, as viewed in FIG. 3, somewhat beyond the location at which one end of the slack adjusted passageway 49 opens at the wall surface of the bore 4 in the brake cylinder body 2. The short sleeve 63 cooperates with the sleeve 5 to form the chamber 64 which provides a volume that is in addition to the volume provided by the annular chamber 65. The arrangement of the constantly connected chambers 64 and 65 provides a larger equalization volume than is provided by chamber 13 in FIG. 1, which larger equalization volume is available for use where such a larger equalization volume may be required.

As shown in FIG. 3, the sleeve 5 has extending inward from the right-hand end thereof a first cored passageway 66, the right-hand end of which is provided with a counterbore 67 into which is press-fitted a plug 68 to close the right-hand end of this passageway 66, the axis of which passageway is parallel to the axis of the sleeve 5. The sleeve 5 is provided with a second cored passageway 69 which is so located in the sleeve 5 that its axis is coextensive with the axis of the slack adjuster passageway 49 in the brake cylinder body 2. One end of this second cored passageway 69 opens into the first cored passageway 66 adjacent the left-hand end thereof and the other end of this passageway 69 opens at the inside wall surface of the sleeve 5.

The flange 62 on the right-hand end of the sleeve 5 is provided with a cored passageway 70, the axis of which is at a right angle to the axis of the sleeve 5 and is so located that one end of this passageway 70 opens into the first cored passageway 66 at the left-hand side of the plug 68. The other end of the passageway 70 opens at the peripheral surface of the flange 62.

The flange 62 is provided with a peripheral annular groove 71 that is located on the right-hand side of the opening of the passageway 70 at the peripheral surface of this flange. An O-ring 72 is disposed in the peripheral annular groove 71, which O-ring forms a seal with the wall surface of the bore 4 in the brake cylinder body 2.

Adjacent the left-hand end thereof and at a location to the left of the axis of the slack adjuster passaageway 49, the short sleeve 63 is provided with a peripheral annular groove 73 in which is disposed an O-ring 74 that forms a seal with the wall surface of the bore 4 in the brake cylinder body 2. From the foregoing, it is apparent that the cored passageways 69, 66 and 70, the two O-ring seals 72 and 74, and an annular chamber 75 formed between the peripheral surface of the short sleeve 63 and the wall surface of the bore 4 in the brake cylinder body 2 and extending longitudinally, as viewed in FIG. 3, between the O-rings 72 and 74, form a conduit through which fluid under pressure may flow from the interior of the sleeve 5 to the slack adjusted passageway 49 and pipe 54 when the stroke of a piston, such as the piston 12 shown in FIG. 1, which is slidably mounted in the sleeve 5, exceeds a certain normal value which is that required to bring the brake shoes into braking contact with the tread surface of the corresponding wheels prior to the occurrence of wear of the brake shoes.

The converted brake cylinder devices shown in FIGS. 1 and 3 are identical in construction, except as pointed out above. Furthermore, their operations are identical. Therefore, a detailed description of the operation of the structure disclosed in FIG. 3 is not deemed necessary to an understanding of this embodiment of the invention.

Having now described the invention, what I claim as new and desire to secure by Letters Patent, is:

1. A brake cylinder device comprising:
   (a) a brake cylinder body provided with a bore and a port opening at one end at the wall surface of said bore and at the opposite end to the exterior of the body for connection to an exterior device,
   (b) a non-pressure head secured to one end of said brake cylinder body,
   (c) a hollow sleeve, the outside diameter of which is less than the diameter of the bore in said brake cylinder body,
   (d) a pressure head having one end of said hollow sleeve attached thereto whereby said pressure head can be secured to the other end of said brake cylinder body in substitution for the usual pressure head, to position said hollow sleeve in said brake cylinder body coaxial therewith,
   (e) an out-turned flange formed integral with said hollow sleeve and located thereon so as to be in alignment with the end of the port that opens at the wall surface of said bore in said brake cylinder body, said out-turned flange being provided with a passageway opening at one end at the inside wall surface of said hollow sleeve and communicating at the opposite end with said port, and
   (f) sealing means interposed between the inside wall surface of said bore in said brake cylinder body and the periphery of said out-turned flange and providing a sealed communication between said passageway in said out-turned flange and the port in said brake cylinder body.

2. A brake cylinder device, as claimed in claim 1, further characterized in that said sealing means comprises a plurality of O-rings, at least one of which is disposed on each side of the adjacent ends of said passageway in said out-turned flange and the port in said brake cylinder body.

3. In a brake cylinder device of the type having a brake cylinder body provided with a port opening out of the piston bore thereof for connection to an exterior device, a conversion element comprising:
   (a) a hollow sleeve,
   (b) a pressure head having one end of said sleeve attached thereto whereby said pressure head can be secured to one end of the brake cylinder body in substitution for the usual pressure head, to position said hollow sleeve coaxially within the piston bore of the cylinder body,
   (c) an out-turned flange formed integral with said hollow sleeve and so located thereon so as to be in alignment with the port in the brake cylinder body, said out-turned flange being provided with three spaced-apart peripheral annular grooves and a passageway opening at one end at the inside wall surface of said hollow sleeve and at the opposite end at the bottom surface of the center one of said three peripheral annular grooves,
   (d) a pair of O-rings, one disposed in each of the two outside peripheral annular grooves in said flange for forming a seal with the internal wall surface of the brake cylinder body on opposite sides of the port therein, and
   (e) a piston slidably mounted in said hollow sleeve and operated responsively to fluid pressure acting thereon in the chamber formed between the piston and the pressure head, said piston being effective when shifted past the opening of said passageway in the wall of said sleeve to establish communication between the chamber and the port via said passageway.

4. A conversion element, as claimed in claim 3, further characterized in that said pressure head is provided with a passageway connecting the interior of said hollow sleeve and the chamber formed between the outside of said sleeve and the wall surface of the piston bore in the brake cylinder body and extending between said pressure head and said flange.

5. For use with an existing brake cylinder device of the type comprising a cylindrical body portion having a port in the wall thereof subject to control by the piston in the cylinder, a conversion element to effect a reduction in diameter of the brake cylinder device to enable a smaller diameter piston to be employed, said conversion element comprising:
   (a) a pressure head conforming dimensionally to and being a substitute for the usual pressure head of the existing brake cylinder device, and
   (b) a hollow sleeve formed integral with said pressure head so as to be coaxially disposed within the cylindrical body portion, when said pressure head is secured thereto, for receiving the piston of smaller diameter than the standard size piston used in the cylindrical body portion prior to placing said hollow sleeve therein, said hollow sleeve being provided intermediate its ends with an out-turned flange having a peripheral annular groove and at least one passageway opening at one end at the bottom of said groove and at the opposite end at the inside wall surface of said hollow sleeve, said flange having sealed relation with the said body portion thereby to provide communication between the interior of said hollow sleeve and the port in the cylinder body via said at least one passageway.

6. A conversion element, as claimed in claim 5, further characterized in that said pressure head has therein a passageway providing a constantly open communication between the interior of said hollow sleeve and the chamber formed on the outside of said hollow sleeve between said pressure head and said flange.

7. For use with an existing brake cylinder device of the type comprising a cylindrical body portion having a port in the wall thereof subject to control by the piston in the cylinder, a conversion element to effect a reduction in diameter of the brake cylinder device to enable a smaller diameter piston to be employed, said conversion element comprising:
   (a) a pressure head conforming dimensionally to and being a substitute for the usual pressure head of the existing brake cylinder device,
   (b) a hollow sleeve attached at one end to said pressure head so as to be coaxially disposed within the cylindrical body portion, when said pressure head is secured thereto, for receiving the piston of smaller diameter than the standard diameter piston used in the cylindrical body portion prior to placing said hollow sleeve therein,
   (c) an out-turned flange formed integral with said sleeve at the end thereof opposite said pressure head, said flange having a skirt extending from one side thereof in concentric relation to said hollow sleeve to form a volume therebetween and cooperating with the wall surface of the cylindrical body portion to form an annular chamber in communication with the port in said wall of the cylindrical body portion, and a passageway opening at one end at the inside wall surface of said hollow sleeve and at the opposite end into said annular chamber at the periphery of said out-turned flange, and
   (d) sealing means provided between said wall of the cylindrical body portion and the periphery of said skirt, and between said wall and the periphery of said flange to provide a sealed communication between the passageway in said out-turned flange and the port in said wall of the cylindrical body portion.

8. A conversion element, as claimed in claim 7, further characterized in that said sealing means comprises a pair of O-rings, one disposed about the periphery of said skirt adjacent the end thereof opposite said out-turned flange and at one end of said annular chamber, and the other disposed about the periphery of said flange at the opposite end of said annular chamber.

9. A conversion element, as claimed in claim 7, further characterized in that the end of said passageway in said out-turned flange that opens at the inside wall surface of said hollow sleeve is in radial alignment with the port in the wall of the cylindrical body portion of the existing brake cylinder device, and in that the other end of said passageway opens at the periphery of said flange between said pair of O-rings.

References Cited by the Examiner
UNITED STATES PATENTS 1,065,311 6/1913 Gray _____ 92—128
3,152,516 10/1964 Allan _____ 92—59 X MARTIN P. SCHWADRON, *Primary Examiner.*

SAMUEL LEVINE, *Examiner.*

I. C. COHEN, *Assistant Examiner.*